Dec. 29, 1959 L. B. WALLER 2,919,054
MATERIAL SPREADERS AND SEEDERS
Filed Oct. 11, 1954 5 Sheets-Sheet 1
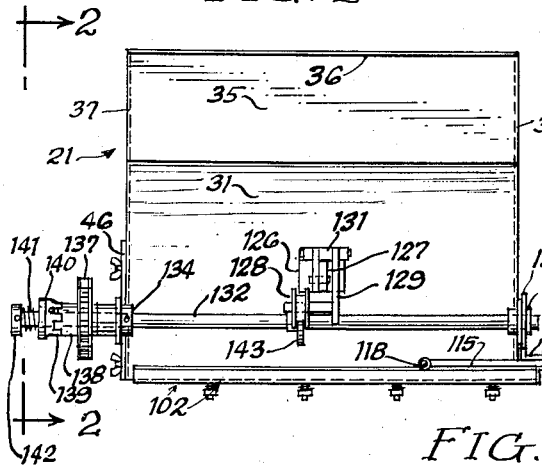
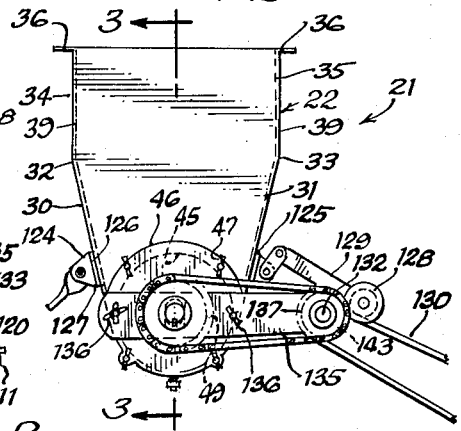
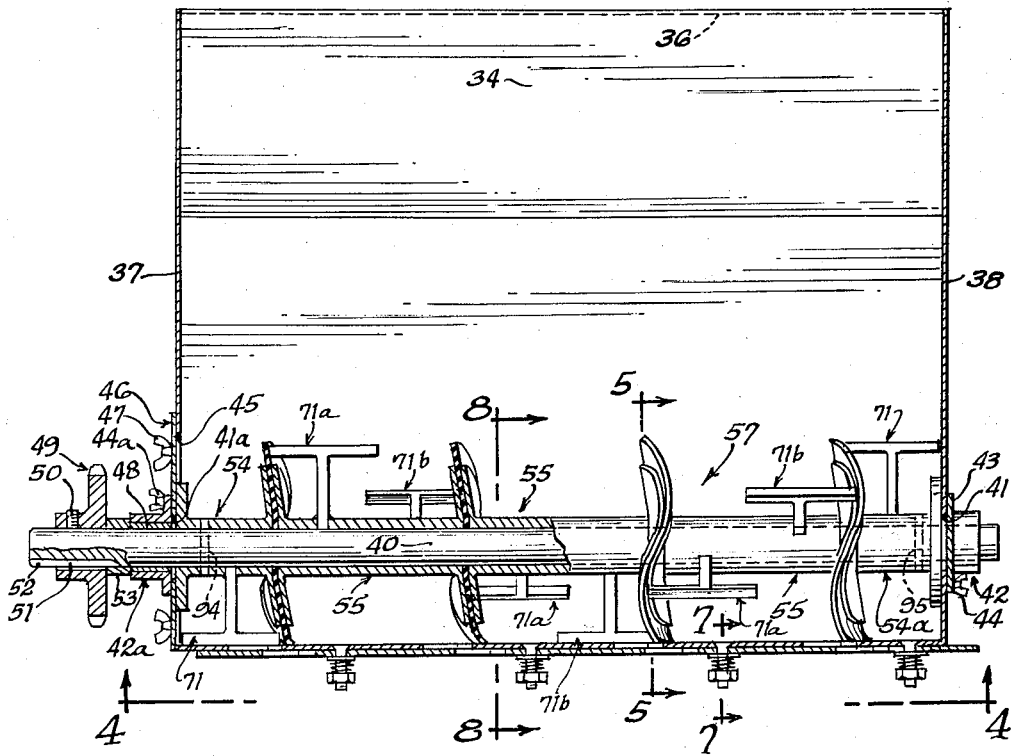
INVENTOR.
Loren B. Waller
BY
Robert H. Wendt
Att'y Dec. 29, 1959   L. B. WALLER   2,919,054
MATERIAL SPREADERS AND SEEDERS
Filed Oct. 11, 1954   5 Sheets-Sheet 2
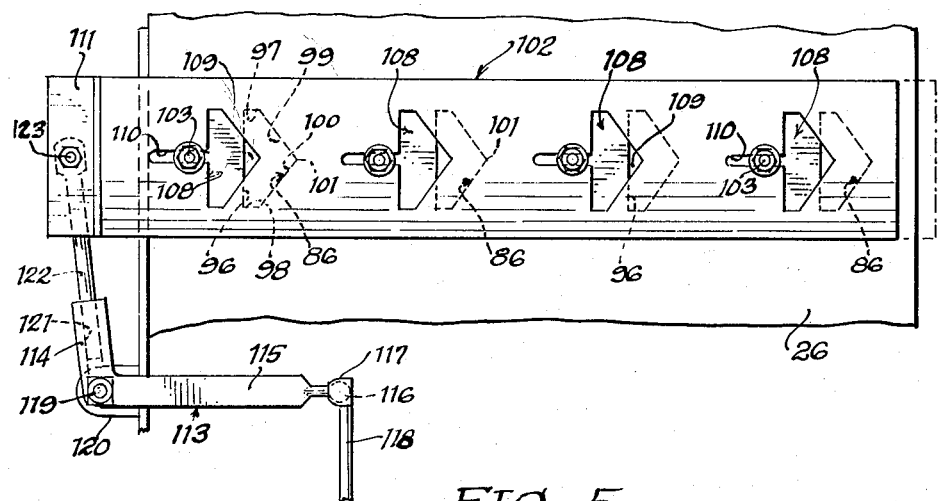
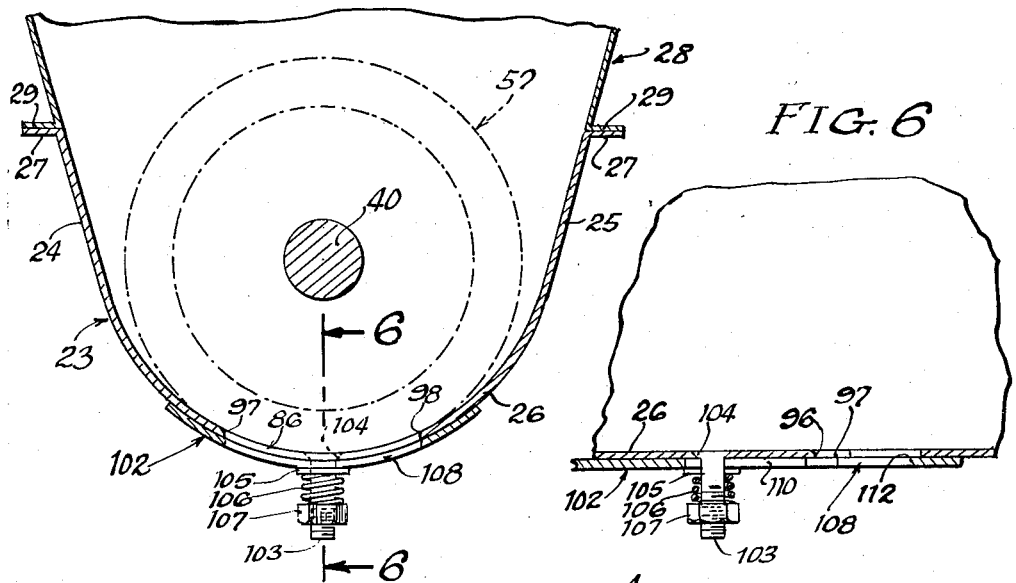
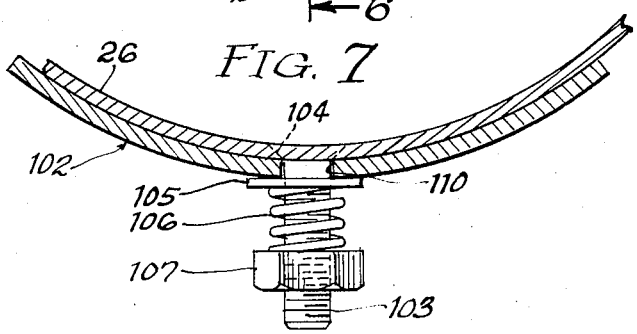
INVENTOR.
Loren B. Waller
BY
Robert H. Wendt
Att'y Dec. 29, 1959 L. B. WALLER 2,919,054
MATERIAL SPREADERS AND SEEDERS
Filed Oct. 11, 1954 5 Sheets-Sheet 3
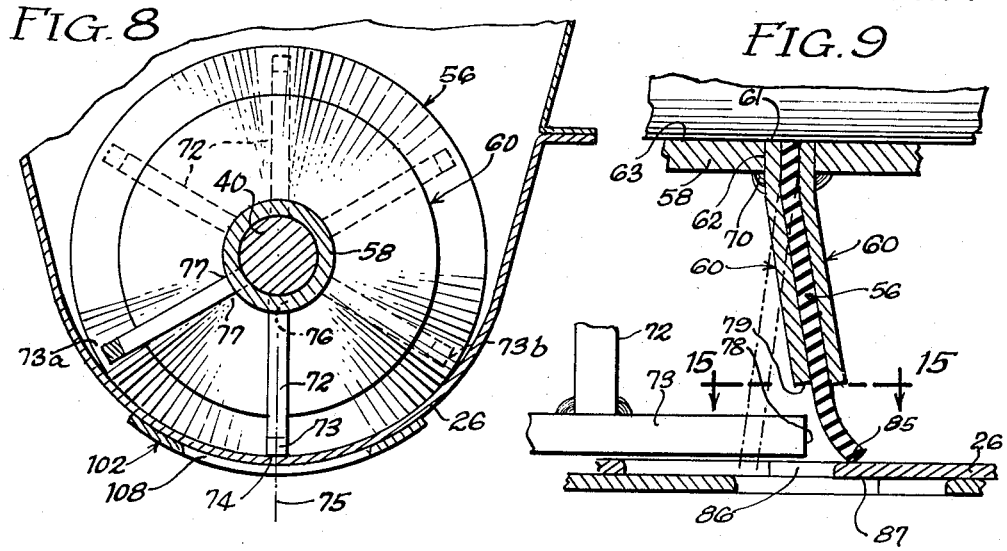
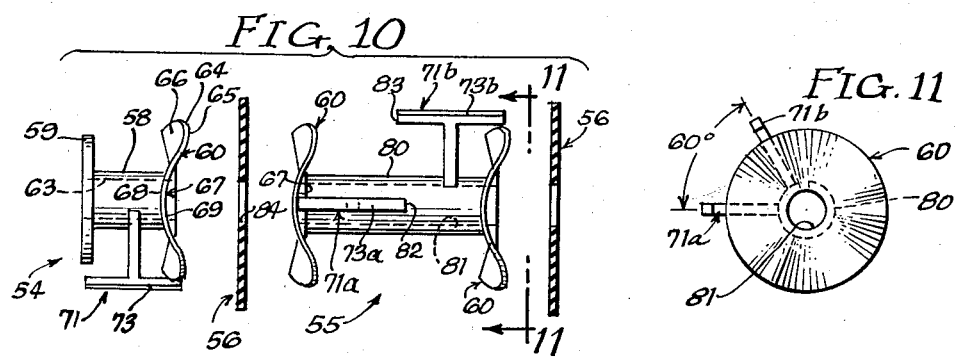
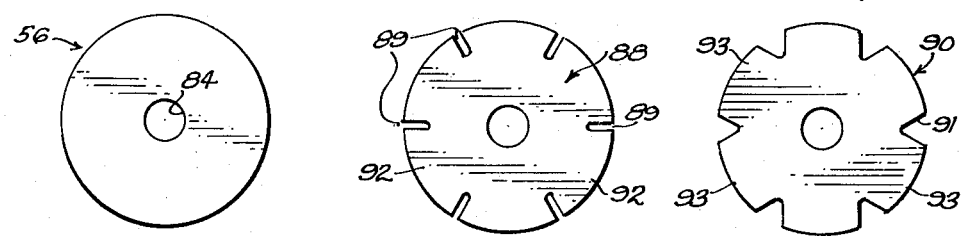
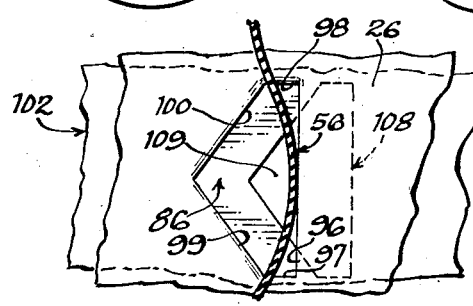
INVENTOR.
Loren B. Waller
BY
Robert H. Wendt
Att'y Dec. 29, 1959 L. B. WALLER 2,919,054
MATERIAL SPREADERS AND SEEDERS
Filed Oct. 11, 1954 5 Sheets-Sheet 4

INVENTOR.
Loren B. Waller
BY
Robert H. Wendt
Att'y

Dec. 29, 1959  L. B. WALLER  2,919,054
MATERIAL SPREADERS AND SEEDERS
Filed Oct. 11, 1954  5 Sheets-Sheet 5
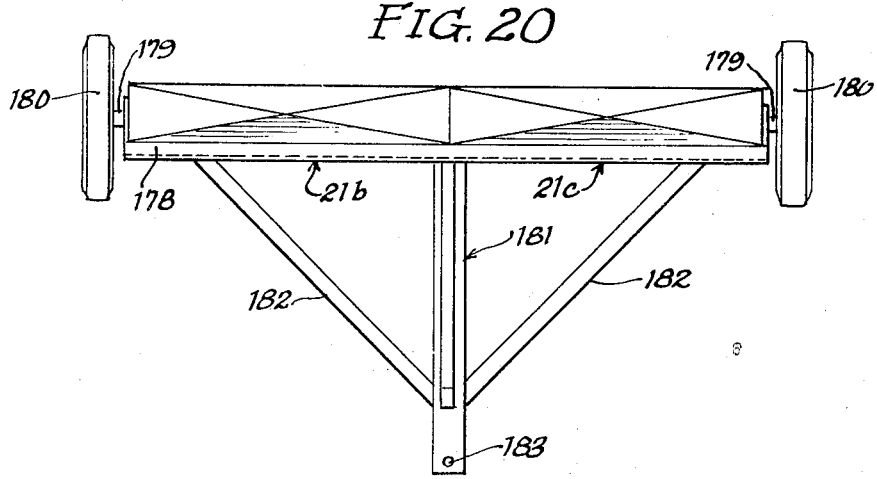
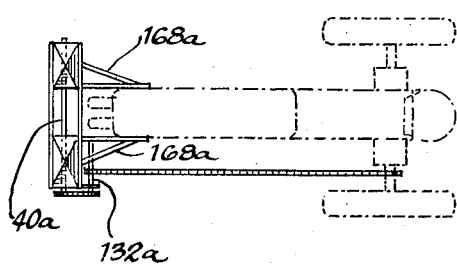 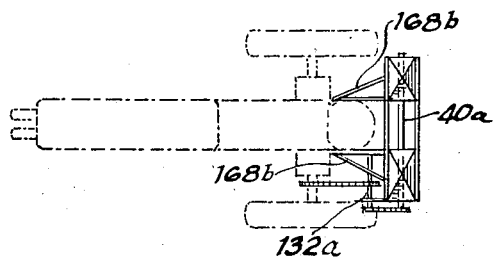
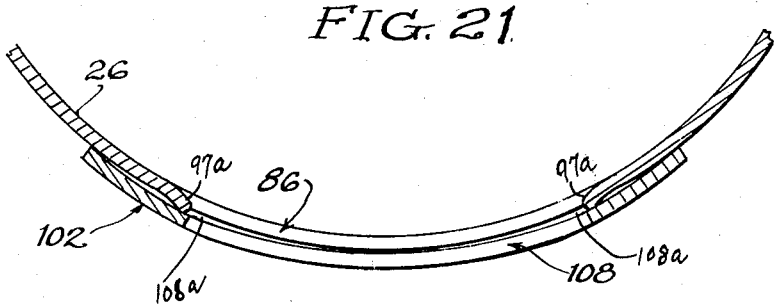
INVENTOR.
Loren B. Waller
BY
Robert H. Wandt
Att'y

United States Patent Office 2,919,054
Patented Dec. 29, 1959

2,919,054

MATERIAL SPREADERS AND SEEDERS

Loren B. Waller, Chicago, Ill., assignor to Wil Flo Company, Chicago, Ill., a copartnership Application October 11, 1954, Serial No. 461,417

34 Claims. (Cl. 222—135)

The present invention relates to material spreaders and seeders, and is particularly concerned with such devices of the type employing a hopper with a rotatable agitator and feeding element.

One of the objects of the invention is the provision of an improved material spreader and seeder which is adapted to be used for distributing fertilizer, lime, grains, seeds, sand, and other similar materials in an even, steady, and uniform manner, metering the amount discharged and distributed in such manner as to permit the spreading of such material at rates which may vary from five pounds per acre to five thousand pounds per acre.

Another object of the invention is the provision of a material spreader which is adapted to handle such material whether it is dry, moist, granular, lumpy, sticky, or in the form of fine grain or seeds, any of such materials being broken up or separated into small particles or units so that a measured amount may be discharged in a uniform stream, depending upon the adjustment of the mechanism.

Another object of the invention is the provision of an improved spreader which is adapted to accomplish the discharge of fertilizers, chemicals, and other materials with the required amount of force to insure the discharge of a measured amount, and which is also adapted to eject small grains and seeds without breaking, cutting, cracking, skinning, or otherwise so damaging the seed as to interfere with its germination.

Prior to my invention the force necessary to discharge materials with many of the above-mentioned characteristics was damaging to small grains, legumes, and other fragile and irregular shaped seeds, thus limiting the utility of a spreader to the spreading of materials other than seeds or grain.

Another object of the invention is the provision of an improved spreader unit which is adapted to handle dry, moist, hard, lumpy, caked, granular, "green," sticky, or extremely light and fluffy materials, or any combination thereof, so that all such materials may be broken up or separated into small particles or units, enabling the precise measurement and discharge of measured amounts of such materials in a uniform stream, depending upon the adjustment of the mechanism.

Another object of the invention is the provision of an improved multipurpose spreading device which is adapted to be used not only for spreading chemicals, fertilizer, sand or other lumpy materials required to be broken up, but is also adapted to be used for spreading seeds and grains without damaging the seeds or grains, which latter result, has often been attempted with the devices of the prior art but so far as I am aware has never been successfully accomplished by the same devices which are used for spreading fertilizers or chemicals.

Another object of the invention is the provision of an improved spreader which is also adapted to be used as a seeder; and which is so constructed that it does not crush or damage seeds but is adapted to separate the bulk charge of seeds into smaller units containing one or more seeds, so that the mechanism may be so adjusted that when the discharge apertures are nearly closed, as few as two or three of the seeds of certain sizes may be discharged at one time, thereby permitting a maximum amount of flexibility in the adjustment of the amount distributed from minimum to maximum and vice versa.

Another object of the invention is the provision of an improved hoppers and metering shutters which are in construction, durable, capable of economical manufacture, which includes a minimum number of parts and which is not only adapted to break up and discharge metered amounts of hard and lumpy material, but may also be used for handling and discharging accurately metered amounts of seeds and grains without damaging the seeds or grains in any manner.

Another object of the invention is the provision of improved hoppers and metering shutters which are self-cleaning and in which the shutter is easily and quickly removable as a unit for cleaning, when it is made necessary by the spreading of gummy or sticky materials, which should be completely eliminated from the hopper and shutter before beginning the spreading of seeds or grains and in which the shutter may again be readily installed with a minimum amount of labor.

Another object of the invention is the provision of an improved agitator and feeder assembly of the type utilizing a rotatable shaft, which assembly is adapted to agitate constantly all of the material in the hopper so that it tends to maintain a level condition, eliminating the bridging over of the material from one side of the hopper to the other, and maintaining the material to be spread in a moving condition above the discharge apertures from which a measured amount of the material to be spread is periodically forcibly discharged.

Another object of the invention is the provision of an improved feeder agitator and feeder assembly of the type mounted on a rotatable shaft, which is adapted to prevent the material from adhering to the sides or bottom of the hopper, and adapted to break up hard or lumpy material and to separate lumpy or coherent materials into smaller units so that a wide range of sizes of increments of the material to be spread may be discharged periodically and uniformly from the discharge apertures of the hopper, depending upon the adjustment of the side of the apertures.

Another object of the invention is the provision of an improved hopper and agitator assembly, in which the agitating elements are so arranged that they act consecutively in their engagement of the material in the hopper, and in scraping the bottom, so that the resistance to rotation of the agitator shaft is applied consecutively by one feeder blade after another with a minimum amount of vibration or jerking of the feeder blades and a minimum total torque is required.

Another object of the invention is the provision of an improved mode of mounting material spreaders and seeders on tractors or the like, which is universally applicable to practically all of the tractors which are on the market, and the provision of an improved structure for the material spreaders utilizing parts which are similar to each other wherever possible, so that the spreader may be installed on the left hand, right hand, front, or the back, or the middle of a tractor, utilizing the same parts and reducing the number of parts that must be kept in stock to a minimum.

Another object of the invention is the provision of an improved agitator assembly which may be removed from the hopper easily for the purposes of cleaning, repainting, storing or repair, and which may be easily reinstalled.

Another object of the invention is the provision of an improved spreader and seeder which is universally adapted to be driven and moved over the ground by being mounted on wheels, tractors, trucks, automobiles, animal driven vehicles and farm implements, such as cultivators and other implements.

Another object of the invention is the provision of an improved spreader unit which may be made of one long unit or one or more short units adapted to be mounted and actuated on various tractor drawn implements, such as grain drills, ploughs, land packers, mulchers, chisel ploughs, moldboard ploughs, disc ploughs, and various other implements having a suitable framework for supporting the spreader.

Another object of the invention is the provision of an improved spreader unit which is adapted to be arranged with improved wheel spacing when mounted on a tractor or on wheels, permitting its use with all row crops, regardless of width by proper spacing of the wheels and spreader units from each other.

Other objects and advantages of the invention will be apparent from the following description and the accompanying drawings, in which similar characters of reference indicate similar parts throughout the several views.

Referring to the drawings, of which there are five sheets accompanying the specification, Fig. 1 is a rear elevational view of a material spreader assembly embodying the invention, shown apart from the tractor;

Fig. 2 is an end elevational view of the same taken on the plane of the line 2—2 of Fig. 1, looking in the direction of the arrows;

Fig. 3 is a vertical, sectional view on a larger scale taken on the plane of the line 3—3 of Fig. 2, looking in the direction of the arrows;

Fig. 4 is a fragmentary, bottom plan view taken on the plane of the line 4—4 of Fig. 3, looking in the direction of the arrows;

Fig. 5 is a fragmentary sectional view taken through the hopper on the plane of the line 5—5 of Fig. 3, looking in the direction of the arrows;

Fig. 6 is a fragmentary sectional view taken on the plane of the line 6—6 of Fig. 5, looking in the direction of the arrows;

Fig. 7 is a fragmentary sectional view on a larger scale taken on the plane of the line 7—7 of Fig. 3, looking in the direction of the arrows;

Fig. 8 is a fragmentary sectional view taken on the plane of the line 8—8 of Fig. 3, looking in the direction of the arrows;

Fig. 9 is an enlarged fragmentary sectional view taken on the same plane as Fig. 3, showing the action of the rubber impeller members;

Fig. 10 is an exploded view showing the different types of rotor spools and associated parts which are used in making up the agitator assembly;

Fig. 11 is a fragmentary sectional view taken on the plane of the line 11—11 of Fig. 10, looking in the direction of the arrows and showing the angular relation of the successive agitator members;

Fig. 12 is an elevational view of the preferred form of rubber disc employed in the agitator assembly;

Fig. 13 is a similar view of an alternative form of rubber disc;

Fig. 14 is another similar view of another modified form of rubber disc;

Fig. 15 is a fragmentary top plan view taken on the plane of the line 15—15 of Fig. 9, looking in the direction of the arrows showing the relation of the rubber impeller disc to the discharge apertures;

Fig. 18 is a top plan view on a smaller scale showing a front mounted spreader on a tractor;

Fig. 19 is a similar view showing a rear mounted spreader on a tractor;

Fig. 20 is a top plan view showing a wheel mounted spreader to be drawn behind a tractor;

Fig. 21 is a fragmentary sectional view taken on the same plane as Fig. 5, showing a modification in the shape of the discharge port.

Figure 16:
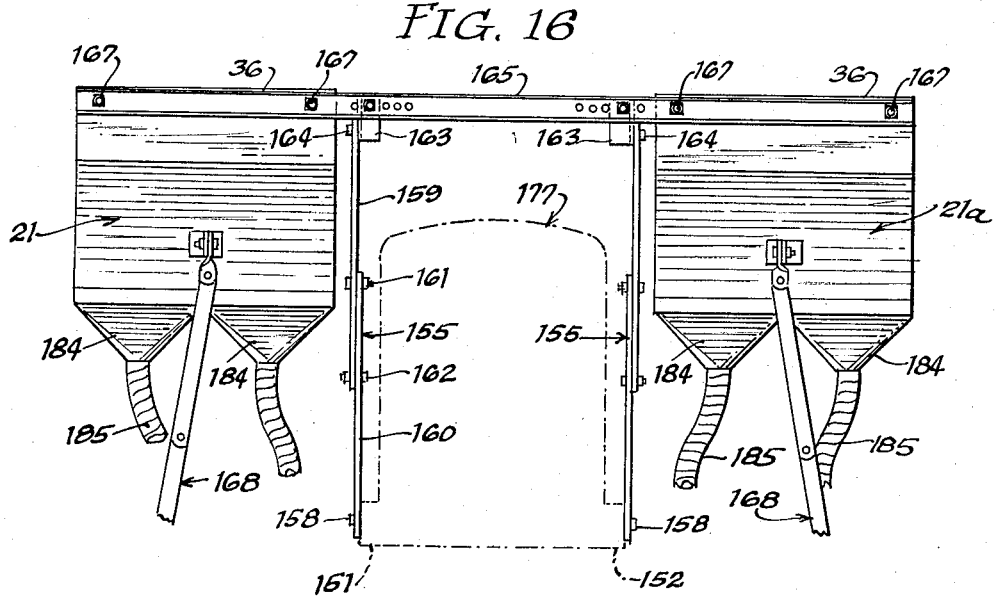
Fig. 16 is a fragmentary front elevational view of a spreader installation and its mounting on a tractor.

Referring to Figs. 1 to 7, the present material spreaders and seeders preferably include one or more of the spreader units of the type shown in these figures, one of these units being indicated in its entirety by the numeral 21.

Each spreader unit preferably includes a hopper 22, which is preferably made of sheet metal, having a bottom wall member 23, Fig. 5, formed out of a single sheet of metal with a pair of straight diverging sides 24 and 25, and joined by a curved central portion 26, which may be partially cylindrical.

The straight sides 24 and 25 are each provided with the laterally extending horizontal attaching flanges 27, by means of which the bottom member 23 may be attached to the upper hopper member 28, which has attaching flanges 29 engaging the attaching flanges 27.

The upper hopper member 28 has slanting side walls 30, 31, extending upward and diverging at the same angle as the lower side walls 24, 25 to the points 32, 33, where the side walls of the upper hopper member are bent to provide two parallel portions 34, 35, terminating in laterally extending supporting flanges 36.

The ends 37 and 38 of the hopper comprise two sheet metal members provided with an outline conforming to the round bottom 26, the slanting sides 24, 25, and 30, 31, and to the parallel sides 34, 35, and the hopper ends 37, 38 both have attaching flanges 39 along all edges but the top for overlapping the sides of the hopper to which the end members are secured by welding or other suitable fastening means.

The end walls 37, 38 are adapted to support the agitator shaft 40 for rotation in the hopper and for vertical adjustment; and for this purpose end wall 38 has an enlarged aperture 41 surrounding the shaft, and the end wall supports a flanged bearing member 42 for mounting the shaft.

The increased size of the aperture 41 is for vertical adjustment of the shaft bearing 42, and the flanges 43 of bearing 42 are provided with apertures for receiving bolts 44, provided with wing nuts passing through the bearing flange and end wall, the end wall having slots whereby the bearing 42 may be moved up or down and secured.

At the other end of the hopper the end wall 37 is provided with a still larger aperture 45, large enough to pass the whole agitator assembly; and this aperture is closed by an overlapping plate 46, which is secured to the end wall 37 by a plurality of bolts and wing nuts 47.

In this case the plate 46 has the enlarged aperture 41a for permitting the vertical adjustment of the shaft; and the shaft bearing 42a is similar in construction and is bolted to the plate 46 by bolts having wing nuts, passing through apertures in the bearing 42a and slots in the plate 46.

The actual location of the bolts 44 and 44a is beside the shaft 40, because this permits the location of the slots at each side of the shaft where there is more room for the slots instead of being in the location shown in Fig. 3.

The bearings are each provided with a suitable bearing bushing 48 for rotatably supporting the shaft 40; and where a single spreader unit is employed the shaft 40 extends through the bearing 42, where it is terminated, and is extended beyond the bearing 42a where it supports a sprocket wheel 49, secured to the shaft 40 by a set screw 50, and keyed for rotation with the shaft by a key 51 in keyway 52.

A tubular spacer 53 may space the sprocket wheel 49 from the end of bearing 42a. The shaft 40 is assembled with a plurality of agitator and feeder spools of the type shown in Fig. 10, and indicated at 54 and 55, combined with rubber discs 56, forming an agitator and feeder assembly, which we have indicated in Fig. 3 by the numeral 57.

The agitator and feeder spools are of two types, one type 54 being used only at the ends of the assembly adjacent the end walls 37, 38 of the hopper.

The end spools 54 each comprise a tubular metal body 58, provided with a radially extending thrust flange 59, at one end for slidably engaging the end walls 37, 38 of the hopper.

The thrust flanges 59 keep the agitator and feeder unit 57 from moving endwise in the hopper. At its other end the tubular body 58 carries a curved metal plate 60, which is similar to many other curved metal plates, used in the agitator and feeder assembly, and the plate 60 has a central aperture 61 at a central flat portion 62, the aperture being large enough to pass the shaft, and having its walls arranged flush with the bore 63 in the tube 58.

The curved metal plate 60 is constructed according to a definite plane of curvature so that it has three curved portions 64 at its periphery, which are convex toward the right at 65, and concave toward the left at 66.

These curved portions 64 are spaced angularly by sixty degrees, and each one occupies substantially sixty degrees of the periphery of the plate 60, extending from one point to another on the periphery in the plane of the flat portion 62.

Between the curved portions 64, which bulge toward the right in Fig. 10, there are three oppositely curved portions 67 which are convexly curved at 68 on the left, and concavely curved at 69 on the right.

The curved portions 67 which bulge toward the left each occupy about sixty degrees of the periphery, and the curved area in each case tapers inwardly toward the center, occupying a sixty degree sector of the circular plate 60.

All of the foregoing oppositely curved portions are thus alternately located and integrally secured together, being parts of the same circular disc, and integrally secured to the central flat portion which may be absolutely plane about the bore 61, so that they may be welded to the tube 58 at 70.

The shape of the curves at the periphery of the curved plate may be varied and may comprise some cylindrical portions; but in general since the curved portions are reversed in direction from one side to the disc, and this change of curvature takes place gradually; and it may be said that the curves may take the approximate form of a shallow sine wave at the periphery; and all of the curved plates used in the assembly are identical in shape and may be formed by a stamping or casting operation which assures their identity.

The spool 54 also preferably supports an agitator and scraper member 71, which is of substantially the same shape as a T, having a radially extending strut 72 which carries a transversely extending scraper bar 73, extending at right angles to the radial strut 72 and extending equally in both directions axially of the shaft.

The scraper bar 73 may be substantially rectangular in cross section, as shown in Fig. 8, but has its outer surface 74 curved cylindrically to correspond to the curvature of the bottom member 26 of the hopper at its central axis 75.

The radius of the agitators-scrapers 71 from the center of the shaft is preferably such that it is slightly larger than the radius on which the bottom 26 of the hopper is formed. Thus the scraper bar 73 may come into actual scraping relation with the inside of the hopper bottom 26 only at the middle bottom axis 75.

As the scraper bar 73 rotates upward from the axis 75 it begins to diverge from the curved wall of the hopper bottom 26 until it is spaced as shown at 73a.

On the other side the scraper bar 73b is shown spaced from the hopper bottom 26 which it gradually approaches, until at the position of the scraper bar 73, it is actually scraping the bottom.

The agitators and scrapers 71 may have the inner end of the strut 72 formed to a cylindrical shape, so that it may be mounted for strength in a radial cylindical bore 76 in the tube 58, where each strut is suitably welded, as indicated at 77.

The scraper and agitator 71, on spool 54, and on every other spool is so located that the end of the bar 73, which is adjacent the plate 60, extends into one of the concave portions 66 of the plate 60, beyond the plane 62 of the plate, and thus the strut 72 must be located centrally of the sector which is concavely curved and into which the scraper bar 73 extends.

As seen in Fig. 9, the end 78 of the scraper bar 73 there overlaps the edge 79 of a curved plate 60, with which it is assembled on the tube 58, but the curved plate 60 is formed on a lesser radius and is actually located inside the scraper bar 73 in a radial direction.

The other type of agitator and feeder spool 55 is shown in Fig. 10 and used on the shaft 40 for making up the agitator and feeder assembly on those parts of the shaft which are between the end spools 54 and spaced from the ends 37, 38 of the hopper.

These spools 55 each comprise a tubular metal body 80, of substantially twice the length of the tube 58, and also having a bore 81 for receiving the shaft 40.

At each end the tube 80 supports a curved metal plate 60 which is identical with the curved metal plate just described, and adapted to nest with any other curved plate 60.

The curved plates 60 in this case are both located so that the sectors of curvature toward the right are in the same portion of the circle about the tube, that is, both plates curve to the right at the same part of the periphery, and both plates curve to the left at similar parts of the periphery; and these spools are adapted to be assembled with other spools end to end to form an agitator and feeder assembly which is symmetrical.

At any plane passing through the axis of the shaft 40, and extending outward to the peripheries of the plate 60, it will be found that all of the plates have identical curvature and location.

Each spool 55 is provided with one or more, preferably two, agitator and scraper members 71a, 71b, which are identical in construction to that previously described for the end spool 54.

These agitator members 71a and 71b are located toward opposite ends of the tube 80 so that their scraper bars 73a and 73b have their inner ends 82, 83 overlapping, and their outer ends extending into a concavely curved portion 67 of one of the plates 60 in the same manner as described with respect to the spool 54; and thus the ends of the scraper bars 73, 73a, and 73b all overlap each other in a direction axially of the shaft, so that the entire length of the hopper bottom is subjected to scraping action at the point 74. However, this scraping action takes place intermittently and consecutively as a scraper bar comes into position to scrape a particular part of the bottom.

The two agitator members 71a and 71b are located with their sectors at an angle of sixty degrees, so that when the spools are all assembled on the shaft, as shown in Fig. 3, the agitators-scrapers 71 present a helical succession of these members on the shaft.

Depending upon the length of the hopper, only one or two or perhaps three of these scraper bars are scraping the bottom at the same time, and they come into action consecutively on different parts of the bottom so that the resistance to rotation of the shaft is thus made more uniform and vibration is substantially reduced.

56 indicates a disc of resilient and flexible rubber sheet of substantial thickness which may be reinforced if desired with embedded fabric discs, and which has a central aperture 84 for passing the shaft 40.

Disc 56 being resilient and flexible, when it is clamped between two of the plates 60 the disc 56 may be flatly clamped at its central portion around the shaft, but its other portions conform in shape to the curvature of the two plates 60, between which it is clamped.

The disc 56 is made on a larger radius than the plates 60 and on a larger radius than the combined agitators and scrapers 71, so that when the adjacent scraper bar 73 is scraping the bottom 26, the portion of the disc 56 which is curved about the end 78 of the scraper bar 73 is forced out still farther, as shown at 85 in Fig. 9, by engagement with the curved bottom 26.

The radius of the disc 56 is preferably such that it extends through hopper discharge apertures 86, Fig. 4, to the outside surface 87 of the curved hopper bottom 26, for the purpose of impelling the material to be spread through the discharge apertures 86, as the combined agitator and feeder assembly rotates.

Between the curved plates 60, the rubber disc 56 conforms to the two plates between which it is clamped, and its free edge portion which extends radially beyond the curved plates 60 also curves toward the left and right as determined by the curvature of the clamping plates.

The preferred form of rubber disc is shown in Fig. 12, but in some embodiments of the invention the modified forms of rubber discs shown in Figs. 13 or 14 may be employed.

In Fig. 13 the rubber disc 88 has a plurality of short radial slots 89, located at sixty degrees angularly from each other.

These slots 89 extend only into the free edge portion of the rubber disc and are located at the points where the curved plate passes the central plane of the flat portion 62.

In Fig. 14 another modified form of rubber disc 90 is shown, having V-shaped slots 91 located at sixty degrees from each other and also located with respect to the curved plates at the points where the plates reverse in curvature.

This provides the rubber discs with free radially extending portions 92 or 93, which are, nevertheless, curved toward the left and right alternately in the same manner, but are provided with a greater freedom of action in snapping back and forth over the edge of the discharge aperture 86 in each case.

The spools 54, 55 and rubber discs 56 are assembled on the shaft 40 as follows:

End spool 54, Fig. 3, is properly located on the shaft 40 and secured by a drive pin 94 extending through a registering bore in the tube 58 and shaft 40.

Pin 94 may also serve as a shear pin which is to shear off in the event of the spreader becoming clogged by some unbreakable object, such as a rock or piece of metal caught between the scraper bars and discharge apertures.

Thus the shear pin may be made of brass or aluminum, or a suitable soft iron, while the rest of the parts of the spools and shaft are made of steel.

A rubber disc 56 is then placed on the shaft against the curved plate 60 of the end spool 54 and a spool 55 is slid on the shaft and rotated until its curved portions are adapted to nest with the curved portions of the first plate 60 by deforming the rubber disc.

The combined agitators and scrapers 71 of this new spool must also be in the right radial position so that all of the scrapers will be located in a helical line or in two helical lines, as so desired.

Additional rubber discs and spools 55 are assembled on the shaft 40 and properly located, and finally the other end spool 54a is placed on the shaft and all these parts are subjected to pressure in a press which places the assembly under a suitable compression, to cause all of the curved plates to curve the rubber discs and to compress and clamp the rubber discs until the length of the assembly is of a determined dimension to fit inside the end walls of the hopper.

A second shear pin 95 is then passed through apertures previously provided to hold the parts under compression and in assembly with each other. The shaft drives the end spools through the shear pins 94 and 95, and the other spools are driven by the interengagement of the curved portions, spaced by rubber, with the convex portions of each disc extending axially into the concave portions of the adjacent disc and vice versa.

Thus it is unnecessary to key the other central spools to the shaft.

Referring to Fig. 4, the hopper bottom 26 is provided with a plurality of regularly spaced discharge apertures 86, located in alignment with each other on the axis of the hopper bottom, and their spacing is equal to the spacing of the rubber discs 56 when assembled on the shaft 40.

The discharge apertures 86 preferably have one long straight side 96, extending transversely to the axis of the hopper, and two short straight sides 97, 98 at right angles to the side 96.

Two diagonally extending sides 99, 100, joined at an apex 101, form a V-shaped portion of the aperture which is used in reducing the amount of discharge to a minimum by adjusting the hopper shutter 102.

The hopper bottom 26 is provided with a plurality of threaded studs 103, each of which is countersunk into a suitable aperture 104 in the bottom 26 and located on a line which is in the plane of the axis of the bottom.

The studs 103 are each provided with a suitable washer 105, a compression spring 106 and a nut 107 for resiliently urging the shutter 102 against the bottom.

The shutter 102 comprises a substantially rectangular piece of sheet metal provided with a plurality of discharge apertures 108, located to register with the discharge apertures 86 in one position of the shutter for full discharge, and adapted to be slidably mounted toward the left in Fig. 4 to vary the amount of registration of the two discharge apertures 86 and 108 in the shutter until the discharge of material through them is reduced to a minimum or adjusted as desired.

For example, in Fig. 4 the amount of opening is exemplified by a small triangular space 109, and this may be still further reduced until in some instances the amount of discharge is one grain at a time.

The apertures 108 in the shutter each communicate with an elongated axially located slot 110 of sufficient width to slidably receive the stud bolts 103, and of sufficient length to permit the shutter to move until the discharge apertures 86 are fully closed, if desired, or fully opened.

The stud bolts 103 are welded in their apertures 104 in the hopper bottom 26, which presents a smooth, partially cylindrical surface on its upper side at the bolt heads. The shutter 102 comprises a sheet of steel which is curved complementarily to the hopper bottom 26, which it engages for longitudinal sliding motion, and the shutter 102 is of sufficient length to have an extension 111 projecting from the left end of the hopper in Fig. 4, for engagement with the actuating mechanism.

The discharge apertures 86 in the hopper bottom 26 are preferably provided with a rounded edge along the sides 96, 97 and 98, as shown at 96 in Fig. 6. The discharge apertures 108 in the shutter are also preferably provided with a rounded edge at 112 on the two diagonal sides of the apertures 108 for a reason further to be described.

As seen in Fig. 5, the lateral edges 97, 98 of both discharge apertures are rounded for engagement with the rubber disc 56, previously described, and for reducing to a minimum the tendency to cut or wear the rubber disc.

Referring to Fig. 21, the lateral edges of the discharge port which are straight and parallel to each other are indicated at 97a, and these are preferably not only rounded at their edges but are embossed or bent downwardly, necessitating additional clearance at 108a between the hopper bottom and the shutter, but so rounding the points of engagement between the discharge port and the rubber disc that wear is greatly reduced on the rubber disc.

The compression springs 106 have an initial compression so that they tend to hold the shutter tightly against the bottom and to resist the pressure that is placed upon the shutter by the material which engages that part of the shutter that partially closes the apertures 86.

The actuating mechanism for the shutter may include a bell crank lever 113, having a short arm 114 and a longer arm 115. The longer arm 115 has a ball end 116 received in a suitable ball socket 117 of a connecting rod 118, by means of which the shutter is actuated.

The bell crank 113 is pivotally mounted by bolt 119 on a bracket 120, carried by the end 38 of the hopper.

The short arm 114 is provided with an aperture 121 for slidably receiving one end of the extension rod 122, the other end of which is pivotally secured to the shutter extension 111 by means of a bolt 123.

The hopper sides 30 and 31 are preferably provided with a plurality of identical brackets 124, 125, each of which has an attaching flange 126 welded to the side of the hopper, and a pivot flange 127 which may be used for braces or for supporting an idler 128, Fig. 2.

For example, the idler 128 is rotatably mounted on the end of an arm 129 for engaging the belt 130 and taking up slack. The arm 129 is pivotally carried by a bracket 131 which is mounted on the bracket 125 and spring presses the arm 129 toward the belt 130.

The unit is preferably provided with a driving mechanism comprising, a drive shaft 132 and Fig. 1, rotatably mounted upon bearings 133 and 134, which may be carried by laterally extending arms 135 mounted on the end of the hopper by means of bolts and nuts 136.

At the left end of the hopper the arm 135 is carried by the removable plate 46 so as to permit its removal with the impeller unit 57.

The shaft 132 carries a sprocket wheel 137, mounted for free rotation on the shaft, but having a hub 138 provided with axially extending teeth 139 engaging in complementary axial slots in the clutch collar 140.

Clutch collar 140 is splined on shaft 132 to drive the shaft and is urged by compression spring 141 into engagement with the hub 138.

A thrust collar 142 is provided for engaging the other end of spring 141 on shaft 132. Shaft 132 also carries a drive pulley 143 for engagement with belt 130, which may be continuously driven by a suitable pulley 144 on the rear wheel shaft 145 of the tractor.

Thus the shaft 40 of the rotatable agitator may be driven by engaging the clutch 140 or the cluth 140 may be disengaged to stop the drive of the spreader when the tractor is being driven from place to place.

Figure 17:
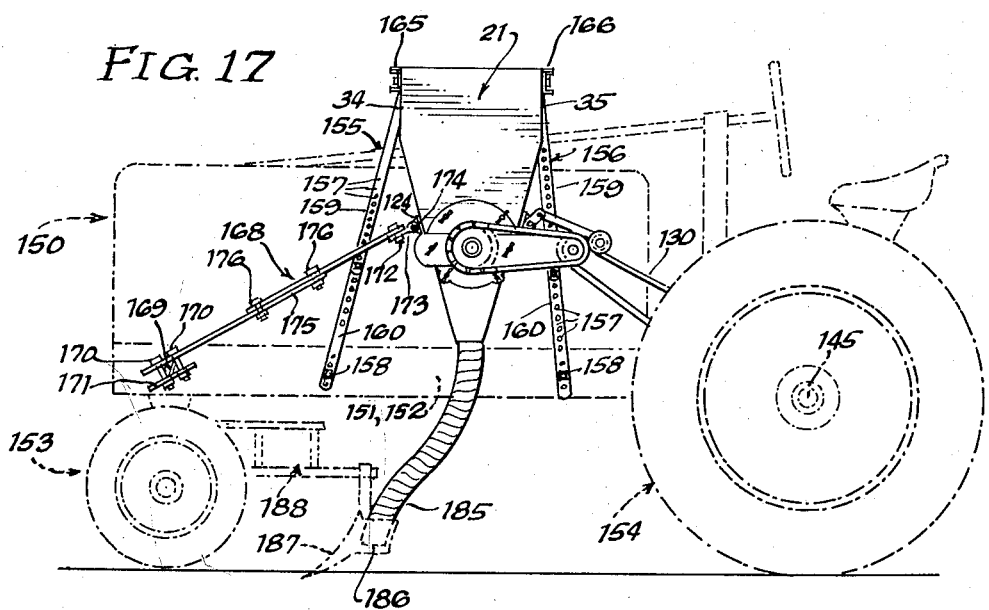
Fig. 17 is a side elevational view of the same mounting showing a center mounted spreader.

The spreader units may be made of any desired length or they may be combined end to end on the tractor for making a longer assembly; and they are preferably mounted on the tractor by means of the mounting arrangements shown in Figs. 16 and 17, which can be used on practically any tractor on the market.

For example, the tractor 150 may have a pair of front to rear frame members 151, 152, forming part of the tractor chassis on which the front wheels 153 are steerably mounted, and the rear wheels 154 are mounted for driving the tractor by means of shaft 145.

The mounting apparatus may comprise a pair of upwardly extending frame members 155, 156, provided with a multiplicity of apertures 157 mounted on each of the chassis frame members 151, 152, by screw bolts 158.

The frame members 155, 156 are each preferably composed of a pair of separate lengths 159, 160 of steel bar, these bars overlapping at their inner ends where their total length is adjustable, and they are secured by screw bolts 161, 162 with nuts and lock washers.

This permits the hoppers to be mounted at any desired elevation.

At their upper ends each of the frame members 155, 156 carries an angle bracket 163 by means of a screw bolt 164, and these angle brackets carry the front and rear channeled hopper supporting members 165, 166. These are spaced sufficiently so that the straight upper walls 34 and 35 of each hopper unit may be received between them, with the laterally turned flanges 36 of the hopper resting on the top of the channels 165, 166.

The hoppers are bolted to the webs of the channels by means of screw bolts and nuts 167, and when the hoppers are so installed, the assembly is rigidly mounted.

Midway between the front and rear of the tractor, two hopper units 21 and 21a may be employed, one on each side of the tractor hood. The hoppers are preferably braced by attaching a forwardly extending brace 168 to each hopper unit on the front side by means of the bracket 124, this brace extending to a projecting lug or shaft 169 on the chassis, where it is clamped by a pair of screw bolts and nuts 170 and a clamping plate 171.

The brace 168 is secured to the bracket 124 by means of a screw bolt 172 and a suitable bracket 173, having apertures at right angles so that the bolt 174 extends in proper direction to engage the bracket 124.

Like the upwardly extending frame members 155, 156, the braces 168 have a multiplicity of apertures and they overlap at the central portion 175, where they are secured by the screw bolts 176 and suitable nuts, and this permits their adjustment in length.

When the hopper units 21 and 21a are disposed on opposite sides of the hood 177 of the tractor, each is provided with a suitable sprocket 49 and separate drive shaft 132, driven from a tractor wheel on each side as shown in Fig. 17.

The hoppers may, however, be mounted on the front of the tractor, as shown in Fig. 18, or on the rear of the tractor, as shown in Fig. 19, in which case a single shaft 40a extends through both of the hopper units and drives the rotatable agitator and feeding element from a single drive shaft 132a, driven from one of the tractor wheels by a belt arrangement, as shown in Fig. 17.

When the hopper is front mounted, as shown in Fig. 18, the braces 168a extend rearwardly, and when the spreader units are rear mounted, as shown in Fig. 19, the braces 168b extend forwardly, as shown in that figure.

The hopper unit may also consist of one long unit or two units 21b and 21c, mounted end to end and supported upon a transverse frame member 178, which is provided with stub shafts 179, carrying the wheels 180, in the case of a wheel mounted spreader.

In this case the rotary agitator and feeding element is driven directly by the wheels 180, and the transverse frame member 178 carries a forwardly extending tongue 181 with braces 182, so that the tongue 181 may be mounted at 183 on the tractor draw bar.

The hopper discharge apertures may discharge their material into the air above the soil in the event it is desired to permit the material to drift downward to the soil. However, the spreader units may be provided with any number of funnels 184, attached to the bottom of the hopper and adapted to receive the material which is discharged to guide it to a flexible metal tube 185 in each case, the tubes having their lower ends 186 disposed behind a cultivator prong 187, which is carried by suitable mounting mechanism 188.

A funnel and tube may be provided for each discharge aperture, or one funnel and tube for all of the discharge apertures of one spreader unit.

As is customary in the art other cultivator prongs, not shown and usually provided on the tractor, are located behind the tube 185 for covering up the seed when the spreader is used as a seeder.

The operation of my improved spreader and seeder is as follows:

As the shaft 40 in each unit is rotated the combined agitators and scrapers 73 approach the bottom 26 of the hopper, one after another, and since they overlap each other at each end they agitate the contents of the hopper over its entire length and tend to break up and pulverize any material which is of a lumpy nature.

They also tend to clean the bottom of the hopper adjacent the discharge apertures 86 and to keep a supply of material available for discharge and in a state of constant agitation.

The rubber discs 56 and curved plates 60 rotating in the hopper tend to create a vacuum on the concave side 166 of each curve and to push the material axially of the shaft 40 on the other side of each plate 60 and rubber discs 56.

The feeder and scraper blades 73, projecting into the curves 66 of the plates 60 and rubber disc 56, push the material before the scraper members 73 and feed it sidewise into the curved recesses 66 of the plate 60 and rubber disc 56.

The rubber disc 56 is of sufficient diameter so that it projects into the discharge apertures 86, when a portion of the rubber disc registers with said discharge aperture; and at other times the extreme edge 85 (Fig. 9) of each rubber disc 56 is curved against the bottom 26. However, as the curved edge 85 progresses in a rotary direction, the curvature causes it to snap down into the discharge aperture 86 and to resiliently urge the material through that portion of the discharge aperture which is open.

The advantages of having a resilient rubber disc for impelling the material through the discharge opening are as follows:

(1) The material will not adhere for any length of time to the rubber because of the snapping, and bending action.

(2) The flexing and snapping action of the rubber is self-cleaning.

(3) The natural characteristics of the rubber employed are such that the material does not tend to gather on it.

(4) The resiliency of the rubber permits it to wipe the discharge apertures as well as project through them.

(5) If any hard material builds up in front of the rubber disc it is scraped away by the overlapping feeder bars, and the hopper bottom is wiped clean by the rubber disc.

(6) The resilient discs being separate and independent units clamped between the curved plates, the resilient discs may be easily removed when necessary for replacement or repair and the welding or cutting by expert machinists, which is required for agitators made entirely of steel, is eliminated.

(7) The resilient nature of the rubber discs permits them to bend and prevents the application of extreme force or crushing or abrasive action on seeds, grains, legumes, grasses or other fragile materials.

(8) The resilient discs may be made out of natural gum rubber or synthetic rubber, or other resilient compositions known under the names "Neoprene" or "butadiene," or compositions of these materials which tend to prevent abrasion of the hopper bottom or wearing out of the hopper adjacent the ports.

(9) The resilient materials employed in the discs are durable, long lasting, non-corrodible, and unaffected by fertilizer acids, chemicals or rust.

(10) The resilient nature of the discs prevents the agitator from becoming locked against any object large or small, such as a hard stone or other foreign objects, which often block the machines of the prior art having rigid steel agitators, and are ejected or passed with the rubber discs because the rubber gives sufficiently to pass over the hard objects or obstructions without interrupting the shaft movement.

(11) The use of resilient, flat discs, adapted to be shaped when assembled by the clamping action of the plates, eliminates the necessity for molding, preforming or shaping the curved portions of the discs, since their shape is the result of their assembly with the curved plates.

The rate of speed of driving the rotatable agitator and feeder may be varied, but the standard speed of drive of distributors and spreaders is four and one-half miles per hour, with a rotative speed of the spreader shaft of 78 r.p.m.; and it is found that the present spreaders are well adapted to this speed of operation.

The present rotatable agitator is effective at all speeds for performing the functions desired of it, from a speed of less than one mile per hour to speeds up to thirty miles per hour, and being symmetrical in shape about the axis of the shaft, the present agitator may be driven in either direction, forward or backward.

The advantages of the T-shaped feeders and scrapers are as follows:

(1) They keep the center of the hopper bottom clean and feed the discharge ports with a constant supply of agitated material.

(2) They keep the ports clear of obstructions, such as paper or gum, which can seal over the discharge ports.

(3) They break down lumpy material, grind it up and pulverize it.

(4) They keep all of the material in a constant state of agitation.

(5) They move the material and keep it level in the hopper.

(6) The feeder blades act consecutively so that there is a minimum amount of vibration and jerk.

(7) The feeders and scrapers are of simple design, are mounted perpendicular to the shaft spindle, and are easily welded in place when this is required for repair or replacement.

(8) The feeders and scrapers overlap each other on each side of each scraper longitudinally of the shaft, thus assuring that no ridge can be built up along the entire hopper bottom, such as occurs with some of the devices of the prior art.

(9) The feeders and scrapers prevent wet material from becoming set or rigid, or getting hard in between the resilient discs.

The advantages of the distributor and spreader units are that the rate of discharge may be adjusted uniformly from about five pounds per acre to five thousand pounds per acre, and the spreaders may be used for all kinds of material, such as fertilizer, sand, seed, lumpy material, gummy material, and a wide range of sizes of grannular material.

They do not damage the seeds because of the resilient wiping and pushing action of the rubber discs, and the smallest seeds to the largest may be used without grinding up the seed.

The rate of discharge may be so adjusted that when the discharge ports are nearly closed, one, two, or three grains of seed, such as oats, will be forced out one at a time, following each other in succession.

The spreaders are adapted to handle wet, hard, lumpy, or gummed up material, and they may be cleaned readily by removing the entire agitator and feeder assembly from one end of the hopper.

It will thus be observed that I have invented an improved spreader and seeder device which is universal in its application to the uniform spreading of all kinds of materials that are desirable to distribute uniformly over the ground.

The present spreader units are made up of a multiplicity of identical parts which may be manufactured at a low cost, and which may be readily replaced, so that any parts which wear out may be replaced with new ones at a minimum cost.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a material spreader having a discharge port, a rotatable agitator unit comprising, a shaft and a plurality of plates, each plate having an aperture for receiving said shaft, the said plates being curved according to a predetermined plane to provide convex and concave portions on the opposite sides of said plates, the plates being assembled on the shaft in pairs between which resilient, flexible discs are clamped, the discs conforming in curvature to said plates, and means to clamp the pairs of plates on the flexible discs, one of said plates being secured on said shaft to rotate with the shaft whereby each of said plates is adapted to drive the adjacent plate through the interengagement with the resilient disc which is adapted to impel the material longitudinally of the shaft by convex portions on one side, and to suck the material longitudinally of the shaft by a vacuum on the other side, while periodically impelling material through said discharge port.

2. In a material spreader having a discharge port, a rotatable agitator unit comprising, a shaft and a plurality of plates, each plate having an aperture for receiving said shaft, the said plates being curved according to a predetermined plane to provide convex and concave portions on the opposite sides of said plates, the plates being assembled on the shaft in pairs between which resilient, flexible discs are clamped, the discs conforming in curvature to said plates, and means to clamp the pairs of plates on the flexible discs, one of said plates being secured on said shaft to rotate with the shaft whereby each of said plates is adapted to drive the adjacent plate through the interengagement with the resilient disc which is adapted to impel the material longitudinally of the shaft by convex portions on one side, and to suck the material longitudinally of the shaft by a vacuum on the other side, while periodically impelling material through said discharge port, the said plates being mounted with a plate at each end of a tube slidably mounted on said shaft, and each of the plates being shaped to nest in an adjacent metal plate with a resilient disc between them.

3. In a material spreader having a discharge port, a rotatable agitator unit comprising, a shaft and a plurality of plates, each plate having an aperture for receiving said shaft, the said plates being curved according to a predetermined plane to provide convex and concave portions on the opposite sides of said plates, the plates being assembled on the shaft in pairs between which resilient, flexible discs are clamped, the discs conforming in curvature to said plates, and means to clamp the pairs of plates on the flexible discs, one of said plates being secured on said shaft to rotate with the shaft whereby each of said plates is adapted to drive the adjacent plate through the interengagement with the resilient disc which is adapted to impel the material longitudinally of the shaft by convex portions on one side, and to suck the material longitudinally of the shaft by a vacuum on the other side, while periodically impelling material through said discharge port, the said plates being mounted with a plate at each end of a tube slidably mounted on said shaft, and each of the plates being shaped to nest in an adjacent metal plate with a resilient disc between them, and shearable means connecting one of said tubes with the shaft to be sheared off in the event of excessive load on any of said plats for driving one of said tubes and its attached plate through said shearable means.

4. In a material spreader having a discharge port, a rotatable agitator unit comprising, a shaft and a plurality of plates, each plate having an aperture for receiving said shaft, the said plates being curved according to a predetermined plane to provide convex and concave portions on the opposite sides of said plates, the plates being assembled on the shaft in pairs between which resilient, flexible discs are clamped, the discs conforming in curvature to said plates, and means to clamp the pairs of plates on the flexible discs, one of said plates being secured on said shaft to rotate with the shaft whereby each of said plates is adapted to drive the adjacent plate through the interengagement with the resilient disc which is adapted to impel the material longitudinally of the shaft by convex portions on one side, and to suck the material longitudinally of the shaft by a vacuum on the other side, while periodically impelling material through said discharge port, the said plates being mounted with a plate at each end of a tube slidably mounted on said shaft, and each of the plates being shaped to nest in an adjacent metal plate with a resilient disc between them, and shearable means connecting one of said tubes with the shaft to be sheared off in the event of excessive load on any of said plates for driving one of said tubes and its attached plate through said shearable means, and a plurality of other units, each comprising a tube with at least one metal plate clamping a resilient disc against another plate, all of said plates being driven from said shearable means.

5. A rotatable agitator and feeder unit for a trough having discharge ports comprising, a shaft and a plurality of spools, each having an aperture for slidably receiving said shaft and each spool being provided with a metal plate, curved axially of said shaft according to a predetermined plane to provide concave and convex portions, and resilient, flexible discs carried by said plates and having a substantially circular edge projecting therefrom, and means to secure the adjacent metal plates in close engagement with the flexible discs between them, the said discs being curved complementarily to said plates and clamped between them for impelling material axially toward discharge ports, and resiliently forcing the material out of the discharge ports.

6. A rotatable agitator and feeder unit for a trough having discharge ports comprising, a shaft and a plurality of spools, each having an aperture for slidably receiving said shaft and each spool being provided with a metal plate, curved axially of said shaft according to a predetermined plane to provide concave and convex portions, and resilient, flexible discs carried by said plates and having a substantially circular edge projecting therefrom, and means to secure the adjacent metal plates in close engagement with the flexible discs between them, the said discs being curved complementarily to said plates and clamped between them for impelling material axially toward discharge ports, and resiliently forcing the material out of the discharge ports, each of said spools at the end of the assembly including a single metal plate, and each of the other spools including a pair of curved metal plates with resilient discs between each pair of adjacent plates.

7. A rotatable agitator and feeder unit comprising, a shaft and a plurality of spools, each having an aperture for slidably receiving said shaft and each spool being provided with a metal plate, curved axially of said shaft according to a predetermined plane to provide concave and convex portions, and resilient, flexible discs carried by said plates and having a substantially circular edge projecting therefrom, the said discs being curved complementarily to said plates and clamped between them for impelling material axially toward discharge ports, and resiliently forcing the material out of the discharge ports, each of said spools at the end of the assembly including a single metal plate, and each of the other spools including a pair of curved metal plates with resilient discs between each pair of adjacent plates, and means for securing the said assembly in a compressed condition on said shaft and for driving all of the metal plates through securing means between the shaft and each of the end spools.

8. A rotatable agitator and feeder unit for a trough having discharge ports comprising, a shaft and a plurality of spools, each having an aperture for slidably receiving said shaft and each spool being provided with a metal plate, curved axially of said shaft according to a predetermined plane to provide concave and convex portions, and resilient, flexible discs carried by said plates and having a substantially circular edge projecting therefrom, and means to secure the adjacent metal plates in close engagement with the flexible discs between them, the said discs being curved complementarily to said plates and clamped between them for impelling material axially toward discharge ports, and resiliently forcing the material out of the discharge ports, each spool including a tube carrying one or more of said metal plates and each of said tubes also supporting a radially extending arm carrying an axially extending scraper member extending parallel to the shaft, and located inwardly of edge of the resilient disc and outwardly of the edge of the metal plates.

9. A rotatable agitator and feeder unit for a trough having discharge ports comprising, a shaft and a plurality of spools, each having an aperture for slidably receiving said shaft and each spool being provided with a metal plate, curved axially of said shaft according to a predetermined plane to provide concave and convex portions, and resilient, flexible discs carried by said plates and having a substantially circular edge projecting therefrom, and means to secure the adjacent metal plates in close engagement with the flexible discs between them, the said discs being curved complementarily to said plates and clamped between them for impelling material axially toward discharge ports, and resiliently forcing the material out of the discharge ports, each spool including a tube carrying one or more of said metal plates and each of said tubes also supporting a radially extending arm carrying an axially extending scraper member extending parallel to the shaft, and located inwardly of the edge of the resilient disc and outwardly of the edge of the metal plates, said scraper members being of such axial length that they overlap each other longitudinally of the shaft, and said scraper members projecting into the curvature of said resilient discs adjacent to which they are located.

10. A rotatable agitator and feeder unit for a trough having discharge ports comprising, a shaft and a plurality of spools, each having an aperture for slidably receiving said shaft and each spool being provided with a metal plate, curved axially of said shaft according to a predetermined plane to provide concave and convex portions, and resilient, flexible discs carried by said plates and having a substantially circular edge projecting therefrom, and means to secure the adjacent metal plates in close engagement with the flexible discs between them, the said discs being curved complementarily to said plates and clamped between them for impelling material axially toward discharge ports, and resiliently forcing the material out of the discharge ports, each spool including a tube carrying one or more of said metal plates and each of said tubes also supporting a radially extending arm carrying an axially extending scraper member extending parallel to the shaft, and located inwardly of the edge of the resilient disc and outwardly of the edge of the metal plates, said scraper members being of such axial length that they overlap each other longitudinally of the shaft, and said scraper members projecting into the curvature of said resilient discs adjacent to which they are located, the said curved plates and resilient discs being arranged so that the scraper members on each tube follow each other at an angular displacement to the next adjacent scraper member in the form of a helix.

11. A material spreader unit comprising, a hopper member of sheet metal provided with a curved bottom having a partially cylindrical portion with discharge ports, and having parallel end walls for rotatably supporting a shaft, the said bottom being provided with regularly spaced discharge apertures, clamping members on said shaft, and a plurality of resilient discs secured by said clamping members on said shaft at regularly spaced points and curved in an axial direction, according to a predetermined plan, and projecting into engagement with said bottom and into said discharge apertures when the curved edge of any disc is in registry with a discharge aperture, the curved resilient discs moving the material constantly back and forth in an axial direction across the discharge apertures, and the edge of said resilient discs snapping into said discharge aperture at a predetermined point in rotation of the resilient disc to force the material out of the discharge aperture.

12. A material spreader unit comprising, a hopper member of sheet metal provided with a curved bottom having a partially cylindrical portion with discharge ports, and having parallel end walls for rotatably supporting a shaft, the said bottom being provided with regularly spaced discharge apertures, clamping members on said shaft, and a plurality of resilient discs secured by said clamping members on said shaft at regularly spaced points and curved in an axial direction, according to a predetermined plan, and projecting into engagement with said bottom and into said discharge apertures when the curved edge of any disc is in registry with a discharge aperture, the curved resilient discs moving the material constantly back and forth in an axial direction across the discharge apertures, and the edge of said resilient discs snapping into said discharge aperture at a predetermined point in rotation of the resilient disc to force the material out of the discharge aperture, the said discharge aperture being provided with a tapering side and with a straight side, and a shutter carried by said hopper, having discharge apertures of similar form, the shutter being adapted to regulate the size of the discharge apertures from a maximum to a minimum at the tapered end, and the resilient discs snapping over the edge of the discharge apertures to discharge material through the discharge apertures at any adjustment of said shutter.

13. A material spreader unit comprising, a hopper member of sheet metal provided with a curved bottom having a partially cylindrical portion with discharge ports, and having parallel end walls for rotatably supporting a shaft, the said bottom being provided with regularly spaced discharge apertures, clamping members on said shaft, and a plurality of resilient discs secured by said clamping members on said shaft at regularly spaced points and curved in an axial direction, according to a predetermined plan, and projecting into engagement with said bottom and into said discharge apertures when the curved edge of any disc is in registry with a discharge aperture, the curved resilient discs moving the material constantly back and forth in an axial direction across the discharge apertures, and the edge of said resilient discs snapping into said discharge aperture at a predetermined point in rotation of the resilient disc to force the material out of the discharge apertures, the said shaft also supporting a plurality of scraper and agitator members, each carried by a radial arm and having an axially extending scraper member parallel to the shaft for scraping the bottom of the hopper and for agitating the material between the said resilient discs.

14. A material spreader unit comprising, a hopper member of sheet metal provided with a curved bottom having a partially cylindrical portion with discharge ports, and having parallel end walls for rotatably supporting a shaft, the said bottom being provided with regularly spaced discharge apertures, clamping members on said shaft, and a plurality of resilient discs secured by said clamping members on said shaft at regularly spaced points and curved in an axial direction, according to a predetermined plan, and projecting into engagement with said bottom and into said discharge apertures when the curved edge of any disc is in registry with a discharge aperture, the curved resilient discs moving the material constantly back and forth in an axial direction across the discharge apertures, and the edge of said resilient discs snapping into said discharge aperture at a predetermined point in rotation of the resilient disc to force the material out of the discharge aperture, the said shaft also supporting a plurality of scraper and agitator members, each carried by a radial arm and having an axially extending scraper member parallel to the shaft for scraping the bottom of the hopper and for agitating the material between the said resilient discs, the said scraper members overlapping each other longitudinally of said shaft and extending in each case into the curvature of a resilient disc.

15. A material spreader unit comprising, a hopper member of sheet metal provided with a curved bottom having a partially cylindrical portion with discharge ports, and having parallel end walls for rotatably supporting a shaft, the said bottom being provided with regularly spaced discharge apertures, clamping members on said shaft, and a plurality of resilient discs secured by said clamping members on said shaft at regularly spaced points and curved in an axial direction, according to a predetermined plan, and projecting into engagement with said bottom and into said discharge apertures when the curved edge of any disc is in registry with a discharge aperture, the curved resilient discs moving the material constantly back and forth in an axial direction across the discharge apertures, and the edge of said resilient discs snapping into said discharge aperture at a predetermined point in rotation of the resilient disc to force the material out of the discharge aperture, the said shaft also supporting a plurality of scraper and agitator members, each carried by a radial arm and having an axially extending scraper member parallel to the shaft for scraping the bottom of the hopper and for agitating the material between the said resilient discs, the said scraper members overlapping each other longitudinally of said shaft and extending in each case into the curvature of a resilient disc, there being a scraper member located on the opposite sides of each resilient disc so that they overlap by extending into the curvature of each disc at angularly spaced points.

16. A material spreader unit comprising, a hopper member of sheet metal provided with a curved bottom having a partially cylindrical portion with discharge ports, and having parallel end walls for rotatably supporting a shaft, the said bottom being provided with regularly spaced discharge apertures, clamping members on said shaft, and a plurality of resilient discs secured by said clamping members on said shaft at regularly spaced points and curved in an axial direction, according to a predetermined plan, and projecting into engagement with said bottom and into said discharge apertures when the curved edge of any disc is in registry with a discharge aperture, the curved resilient discs moving the material constantly back and forth in an axial direction across the discharge apertures, and the edge of said resilient discs snapping into said discharge aperture at a predetermined point in rotation of the resilient disc to force the material out of the discharge aperture, the said shaft also supporting a plurality of scraper and agitator members, each carried by a radial arm and having an axially extending scraper member parallel to the shaft for scraping the bottom of the hopper and for agitating the material between the said resilient discs, the said scraper members overlapping each other longitudinally of said shaft and extending in each case into the curvature of a resilient disc, there being a scraper member located on the opposite sides of each resilient disc so that they overlap by extending into the curvature of each disc at angularly spaced points, the said scraper members being arranged at regularly spaced angles to each other in the form of a helix on said shaft.

17. In a material spreader, the combination of a hopper having a partially cylindrical bottom portion provided with discharge apertures, and a combined agitator and feeder unit having a drive shaft provided with a multiplicity of agitators and scrapers, and a multiplicity of metal plates arranged in pairs and clamping resilient, flexible discs between them, the said discs engaging the bottom of the hopper and projecting through the discharge apertures when in registry therewith, said shaft being mounted removably in a bearing at one end of the hopper, and a second bearing mounting said shaft and carried by a removable plate at the other end of said hopper, the said removable plate closing an aperture of sufficient size to pass the entire agitator and feeder assembly, which may be removed for cleaning or repair.

18. A wheel mounted material spreader comprising, a frame with a pair of supporting wheels mounted upon stub shafts carried by said frame, the said frame also carrying a hopper provided with an agitator and feeder shaft driven forwardly by either of said wheels, the said hopper having a multiplicity of regularly spaced discharge apertures, and said agitator shaft being provided with a multiplicity of resilient, flexible discs curved regularly in both axial directions to impel material in both directions in the hopper and wipe across the discharge apertures, the said discs being of sufficient radius to dip into said discharge apertures when in registry therewith, impelling materials resiliently through the discharge apertures.

19. In a combined seeder and spreader, an elongated trough having a partially cylindrical bottom wall and upwardly spreading side walls joined by end walls, a bearing in each end wall, a driven shaft in said bearings, said bottom wall having a discharge aperture, and a resilient flexible disc carried by said shaft above said discharge aperture and curved sinuously at the outer edge of said disc, said shaft having its axis substantially at the axis of generation of said cylindrical bottom, and said disc having a radius greater than the radius of said cylindrical bottom, whereby the resilient disc is deformed by pressure against said cylindrical bottom at its points of engagement and said disc extends into said aperture during part of the rotation of the disc to impel the contents from said aperture.

20. In a combined seeder and spreader, an elongated trough having a partially cylindrical bottom wall and upwardly spreading side walls joined by end walls, a bearing in each end wall, a driven shaft in said bearings, said bottom wall having a discharge aperture, and a resilient flexible disc carried by said shaft above said discharge aperture and curved sinuously at the outer edge of said disc, said shaft having its axis substantially at the axis of generation of said cylindrical bottom, and said disc having a radius greater than the radius of said cylindrical bottom, whereby the resilient disc is deformed by pressure against said cylindrical bottom at its points of engagement and said disc extends into said aperture during part of the rotation of the disc to impel the contents from said aperture, one of said bearings being supported by an end plate larger than said disc and closing an aperture in the adjacent end wall through which the shaft and assembled parts may be removed or installed endwise.

21. In a combined seeder and spreader, an elongated trough having a concavely curved bottom and having a driven shaft rotatably mounted along the curved bottom of the trough, said bottom having a discharge aperture, a resilient, flexible disc carried by said shaft above said aperture and curved sinuously at the outer edge of said disc, said shaft having its axis closer to said curved trough bottom than the radius of said disc, whereby the disc penetrates through said aperture to insure discharge of the contents of said trough from said aperture.

22. In a combined seeder and spreader, an elongated trough having a concavely curved bottom and having a driven shaft rotatably mounted along the curved bottom of the trough, said bottom having a discharge aperture, a resilient, flexible disc carried by said shaft above said aperture and curved sinuously at the outer edge of said disc, said shaft having its axis closer to said curved trough bottom than the radius of said disc, whereby the disc penetrates through said aperture to insure discharge of the contents of said trough from said aperture, said aperture having its leading and trailing edges downwardly curved to facilitate the passage of curved parts of said disc over said leading and trailing edges with minimum wear.

23. In a combined seeder and spreader, an elongated trough having a concavely curved bottom and having a driven shaft rotatably mounted along the curved bottom of the trough, said bottom having a discharge aperture, a resilient, flexible disc carried by said shaft above said aperture and curved sinuously at the outer edge of said disc, said shaft having its axis closer to said curved trough bottom than the radius of said disc, whereby the disc penetrates through said aperture to insure discharge of the contents of said trough from said aperture, said aperture having a straight, transversely extending edge and said disc being located so that parts of the disc ride on the bottom adjacent said straight edge and parts of the disc snap over said straight edge into said aperture to impel the contents through said aperture.

24. In a combined seeder and spreader, an elongated trough having a concavely curved bottom and having a driven shaft rotatably mounted along the curved bottom of the trough, said bottom having a discharge aperture, a resilient, flexible disc carried by said shaft above said aperture and curved sinuously at the outer edge of said disc, said shaft having its axis closer to said curved trough bottom than the radius of said disc, whereby the disc penetrates through said aperture to insure discharge of the contents of said trough from said aperture, said aperture having a straight, transversely extending edge and said disc being located so that parts of the disc ride on the bottom adjacent said straight edge and parts of the disc snap over said straight edge into said aperture to impel the contents through said aperture, and said apertures having short opposite leading and trailing edges, downwardly bent to be slidably engaged by the leading and trailing parts of said disc as the disc rotates.

25. In a combined seeder and spreader, an elongated trough having a concavely curved bottom and having a driven shaft rotatably mounted along the curved bottom of the trough, said bottom having a discharge aperture, a resilient, flexible disc carried by said shaft above said aperture and curved sinuously at the outer edge of said disc, said shaft having its axis closer to said curved trough bottom than the radius of said disc, whereby the disc penetrated through said aperture to insure discharge of the contents of said trough from said aperture, said aperture having a straight, transversely extending edge and said disc being located so that parts of the disc ride on the bottom adjacent said straight edge and parts of the disc snap over said straight edge into said aperture to impel the contents through said aperture, said apertures having a V-shaped edge formation opposite to said transversely extending edge and a lower sliding plate having apertures with a similar V-shaped edge, the size of opening varying as said plate is slidably adjusted on the trough bottom.

26. A combined spreader and seeder assembly comprising, a trough having a concavely curved bottom wall and end walls, an agitator shaft rotatably mounted in said end walls, a plurality of sinuously curved resilient flexible discs mounted to rotate with said shaft and to engage said concavely curved trough bottom on the inside, said bottom having an aperture located adjacent each flexible disc and said discs dipping into said apertures at some part of the rotation of each disc to force part of the contents of said trough through said apertures.

27. A combined spreader and seeder assembly comprising, a trough having a concavely curved bottom wall and end walls, an agitator shaft rotatably mounted in said end walls, a plurality of sinuously curved resilient flexible discs mounted to rotate with said shaft and to engage said concavely curved trough bottom on the inside, said bottom having an aperture located adjacent each flexible disc and said discs dipping into said apertures at some part of the rotation of each disc to force part of the contents of said trough through said apertures, said shaft also carrying a scraper mounted adjacent each disc on a radially extending arm and scraping over said aperture once each revolution of said shaft.

28. A combined spreader and seeder assembly comprising, a trough having a concavely curved bottom wall and end walls, an agitator shaft rotatably mounted in said end walls, a plurality of sinuously curved resilient flexible discs mounted to rotate with said shaft and to engage said concavely curved trough bottom on the inside, said bottom having an aperture located adjacent each flexible disc and said disc dipping into said apertures at some part of the rotation of each disc to force part of the contents of said trough through said apertures, said shaft also carrying a scraper mounted adjacent each disc on a radially extending arm and scraping over said aperture once each revolution of said shaft, said scraper extending longitudinally into one of the sinuous formations of each disc whereby both the disc and the scraper pass over each of the discharge apertures.

29. A combined spreader and seeder assembly comprising, a trough having a concavely curved bottom wall and end walls, an agitator shaft rotatably mounted in said end walls, a plurality of sinuously curved resilient flexible discs mounted to rotate with said shaft and to engage said concavely curved trough bottom on the inside, said bottom having an aperture located adjacent each flexible disc and said discs dipping into said apertures at some part of the rotation of each disc to force part of the contents of said trough through said apertures, said trough being mounted on a traction tongue for securement to a tractor or the like and said shaft carrying a wheel at each end of said shaft.

30. A combined spreader and seeder assembly comprising, a trough having a concavely curved bottom wall and end walls, an agitator shaft rotatably mounted in said end walls, a plurality of sinuously curved resilient flexible discs mounted to rotate with said shaft and to engage said concavely curved trough bottom on the inside, said bottom having an aperture located adjacent each flexible disc and said discs dipping into said apertures at some part of the rotation of each disc to force part of the contents of said trough through said apertures, a tractor having a pair of front to rear frame members forming a chassis, multiapertured metal bars arranged in pairs on each side of said chassis and each pair being bolted together through said multiapertures to form an adjustable length bar secured to said chassis frame members, transverse metal frame members joining the free ends of said multiapertured bars, said trough resting on said transverse frame members.

31. A combined spreader and seeder assembly comprising, a trough having a concavely curved bottom wall and end walls, an agitator shaft rotatably mounted in said end walls, a plurality of sinuously curved resilient flexible discs mounted to rotate with said shaft and to engage said concavely curved trough bottom on the inside, said bottom having an aperture located adjacent each flexible disc and said discs dipping into said apertures at some part of the rotation of each disc to force part of the contents of said trough through said apertures, a tractor having a pair of front to rear frame members forming a chassis, multiapertured metal bars arranged in pairs on each side of said chassis and each pair being bolted together through said multiapertures to form an adjustable length bar secured to said chassis frame members, transverse metal frame members joining the free ends of said multiapertured bars, said trough resting on said transverse frame members, four of said bars extending upwardly from said chassis frame members above said tractor and said transverse frame members supporting two of said troughs, one on each end of the transverse frame members depending beside said tractor.

32. A combined spreader and seeder assembly comprising, a trough having a concavely curved bottom wall and end walls, an agitator shaft rotatably mounted in said end walls, a plurality of sinuously curved resilient flexible discs mounted to rotate with said shaft and to engage said concavely curved trough bottom on the inside, said bottom having an aperture located adjacent each flexible disc and said discs dipping into said apertures at some part of the rotation of each disc to force part of the contents of said trough through said apertures, a tractor having a pair of front to rear frame members forming a chassis, multiapertured metal bars arranged in pairs on each side of said chassis and each pair being bolted together through said multiapertures to form an adjustable length bar secured to said chassis frame members, transverse metal frame members joining the free ends of said multiapertured bars, said trough resting on said transverse frame members, said multiapertured bars extending longitudinally beyond the end of said tractor and said transverse frame members having a pair of troughs depending therefrom and provided with a common driven shaft in both troughs.

33. An agitator assembly comprising, a shaft, an initially flat, flexible, resilient disc having a central aperture about said shaft, and a pair of nesting similar rigid metal discs sinuously formed at their outer edges and fixedly mounted on said shaft, and located on the opposite sides of said flexible disc and spaced by the thickness of said flexible disc, while shaping the edges of said flexible disc which extend beyond said sinuous discs in sinuous form.

34. An agitator assembly comprising, a shaft, an initially flat flexible, resilient disc having a central aperture about said shaft, and a pair of nesting similar rigid metal discs sinuously formed at their outer edges and fixedly mounted on said shaft, and located on the opposite sides of said flexible disc and spaced by the thickness of said flexible disc, while shaping the edges of said flexible disc which extend beyond said sinuous discs in sinuous form, each rigid disc being mounted at the end of a tube on said shaft and each tube supporting a T-shaped scraper, the column of which has a lesser radius than said resilient disc and the top of which forms a scraper blade extending into a sinuous part of the flexible disc.

References Cited in the file of this patent

UNITED STATES PATENTS

| | | |
|---|---|---|
| 210,462 | Lowell | Dec. 3, 1878 |
| 228,913 | Mann | June 15, 1880 |
| 1,625,345 | Yoncy | Apr. 19, 1927 |
| 1,691,192 | Holmes et al. | Nov. 13, 1928 |
| 1,705,502 | Schellentrager | Mar. 19, 1929 |
| 1,719,162 | Beck | July 2, 1929 |
| 1,948,861 | Lindgren | Feb. 27, 1934 |
| 1,956,460 | Brown | Apr. 24, 1934 |
| 2,321,395 | Kirk | June 8, 1943 |
| 2,530,181 | Schilling | Nov. 14, 1950 |